United States Patent
Jiang (10) Patent No.: US 8,374,468 B2
(45) Date of Patent: Feb. 12, 2013

(54) HIGHLY RARE-EARTH DOPED FIBER ARRAY

(75) Inventor: Shibin Jiang, Tucson, AZ (US)

(73) Assignee: AdValue Photonics, Inc., Tucson, AZ (US)

( * ) Notice: Subject to any disclaimer, the term of this patent is extended or adjusted under 35 U.S.C. 154(b) by 456 days.

(21) Appl. No.: 12/778,712

(22) Filed: May 12, 2010

(65) Prior Publication Data

US 2011/0129180 A1 Jun. 2, 2011

Related U.S. Application Data (63) Continuation-in-part of application No. 12/628,914, filed on Dec. 1, 2009.

(51) Int. Cl.
*G02B 6/00* (2006.01)
(52) U.S. Cl. .................. 385/11; 385/142; 385/144
(58) Field of Classification Search .................. None
See application file for complete search history.

(56) References Cited

U.S. PATENT DOCUMENTS

| | | | | | |
|---|---|---|---|---|---|
| 3,756,690 | A | * | 9/1973 | Borrelli et al. | 385/1 |
| 3,935,020 | A | * | 1/1976 | Deeg et al. | 501/51 |
| 5,087,984 | A | * | 2/1992 | Heiney et al. | 359/282 |
| 5,400,418 | A | * | 3/1995 | Pearson et al. | 385/11 |
| 7,715,094 | B2 | * | 5/2010 | Tokura et al. | 359/341.5 |
| 7,951,735 | B2 | * | 5/2011 | Weber et al. | 501/73 |
| 2005/0225815 | A1 | * | 10/2005 | Patel et al. | 359/1 |
| 2005/0225839 | A1 | * | 10/2005 | Patel et al. | 359/333 |

OTHER PUBLICATIONS

Ballato et al., "Fabrication of fibers with high rare-earth concentrations for Faraday isolator application", Applied Optics, Oct. 20, 1995, pp. 6848-6854, vol. 34, No. 30.

* cited by examiner

*Primary Examiner* — Uyen Chau N Le
*Assistant Examiner* — Chris Chu
(74) *Attorney, Agent, or Firm* — Dale F. Regelman; Quarles & Brady LLP (57) ABSTRACT

An all-fiber Faraday rotator array comprising a plurality of Faraday rotating fibers, each having a doping concentration of 55%-85% (wt./wt.) of a rare-earth oxide, and a magnetic tube surrounding the plurality of Faraday rotating fibers is presented. The rare-earth oxide is selected from the group comprising: $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$; $Er_2O_3$, $Tm_2O_3$, $Yb_2O_3$, $La_2O_3$, $Ga_2O_3$, $Ce_2O_3$, and $Lu_2O_3$. Additionally, an all-fiber isolator using highly rare-earth oxide doped fibers is disclosed.

21 Claims, 8 Drawing Sheets

(Prior Art)

HIGHLY RARE-EARTH DOPED FIBER ARRAY

CROSS REFERENCE TO RELATED APPLICATIONS

This application is a continuation in part of U.S. patent application Ser. No. 12/628,914 (the '914 Application) filed Dec. 1, 2009 entitled "Highly Rare Earth Doped Fiber" to Shibin Jiang and this Application claims priority under 35 U.S.C. 120 to the '914 Application.

The United States Non-Provisional Application having Ser. No. 12/628,914 is hereby incorporated by reference herein.

GOVERNMENT RIGHTS

The U.S. Government has a paid-up license in this invention and the right in limited circumstances to require the patent owner to license others on reasonable terms as provided for by the terms of Contract Nos. FA8650-09-C-5433, FA9451-10-D0233, and FA9451-10-M-0076.

FIELD OF THE INVENTION

Various implementations, and combinations thereof, are related to using highly rare-earth doped fibers for Faraday rotation and more particularly to fiber isolator arrays and fiber polarization rotator arrays using highly rare-earth doped fibers.

BACKGROUND OF THE INVENTION

Faraday rotation, or the Faraday effect, is an interaction between light and a magnetic field. When linearly polarized light passes through a parallel magnetic field, the plane of the linearly polarized light is rotated. The rotation of the plane of polarization is proportional to the intensity component of the magnetic field in the direction of the beam of light. Light that is reflected back through the magnetic field is further rotated in the same direction.

The empirical angle of rotation is given by $$\beta = VBd,$$

where $\beta$ is the angle of rotation (in radians), V is the Verdet constant for the material, B is the magnetic flux density in the direction of propagation (in teslas), and d is the length of the path (in meters).

The Verdet constant reflects the strength of the Faraday effect for a particular material. The Verdet constant can be positive or negative, with a positive Verdet constant corresponding to a counterclockwise rotation when the direction of propagation is parallel to the magnetic field. The Verdet constant for most materials is extremely small and is wavelength dependent. Typically, the longer the wavelength the smaller the Verdet constant.

As can be seen from the relationship between the Verdet constant, the path length, and the angle of rotation, a desired angle of rotation can be achieved in a shorter distance where the Verdet constant is high. The highest Verdet constants are found in terbium gallium garnet (TGG), which has a Verdet constant of −40 rad/T·m at 1064 nm.

SUMMARY OF THE INVENTION

In one implementation, an all-fiber Faraday rotator array is presented. The all-fiber Faraday rotator array comprises a plurality of Faraday rotating fibers each having a doping concentration of 55%-85% (wt./wt.) of a rare-earth oxide and a magnetic tube surrounding the plurality of Faraday rotating fibers. The rare-earth oxide is selected from the group comprising: $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$; $Er_2O_3$, $Tm_2O_3$, $Yb_2O_3$, $La_2O_3$, $Ga_2O_3$, $Ce_2O_3$, and $Lu_2O_3$.

In another implementation, an all-fiber Faraday isolator array is presented. The all-fiber Faraday isolator array comprises a plurality of Faraday rotating fibers each having a doping concentration of 55%-85% (wt./wt.) of a rare-earth oxide, a magnetic tube surrounding the plurality of Faraday rotating fibers, and a plurality of fiber-based polarizers. The rare-earth oxide is selected from the group comprising: $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$; $Er_2O_3$, $Tm_2O_3$, $Yb_2O_3$, $La_2O_3$, $Ga_2O_3$, $Ce_2O_3$, and $Lu_2O_3$. Each of the plurality of Faraday rotating fibers further comprises a first end and a second end, where the first and second ends are fusion spliced. For each of the plurality of Faraday rotating fibers, one of the plurality of fiber-based polarizers is attached to the first end and a second is attached to the second end.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION OF THE PREFERRED EMBODIMENTS

Implementations propose a high rare-earth doped fiber for use in Faraday rotation. Throughout the following description, this invention is described in preferred embodiments with reference to the figures in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment, "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

An optical isolator which allows the transmission of light in only one direction. A Faraday isolator is a specific type of optical isolator that employs a Faraday rotator. A Faraday rotator is a magneto-optic device that rotates the polarization of light as the light is transmitted through a medium exposed to a magnetic field.

A Faraday isolator is polarization dependent and consists of two optical polarizers at either end of a Faraday rotator. Polarized light traveling in a forward direction is aligned to be parallel to the polarization direction of the input polarizer and coupled into the Faraday rotator. The Faraday rotator will rotate the polarization by forty-five (45) degrees. The light then passes through the output polarizer, which is aligned to be parallel to the rotated beam in order to have a low attenuation. Back reflected light propagating in the opposite direction is rotated an additional forty-five (45) degrees when it passes through the Faraday rotator a second time, thereby resulting in an orthogonal polarization direction compared to the input laser beam polarization. The input polarizer thus blocks the reflected light.

Typically, Faraday rotators consist of terbium gallium garnet (TGG) crystal or terbium-doped glass inserted into a magnetic tube. The residual flux density of the magnetic tube should be strong enough to produce a forty-five (45) degree polarization rotation when the light passes through the Faraday rotator. In certain embodiments, the magnetic tube comprises a tube of ferromagnetic material. In certain embodiments, the magnetic tube comprises a tube of any material exposed to a magnetic field.

Figure 1:
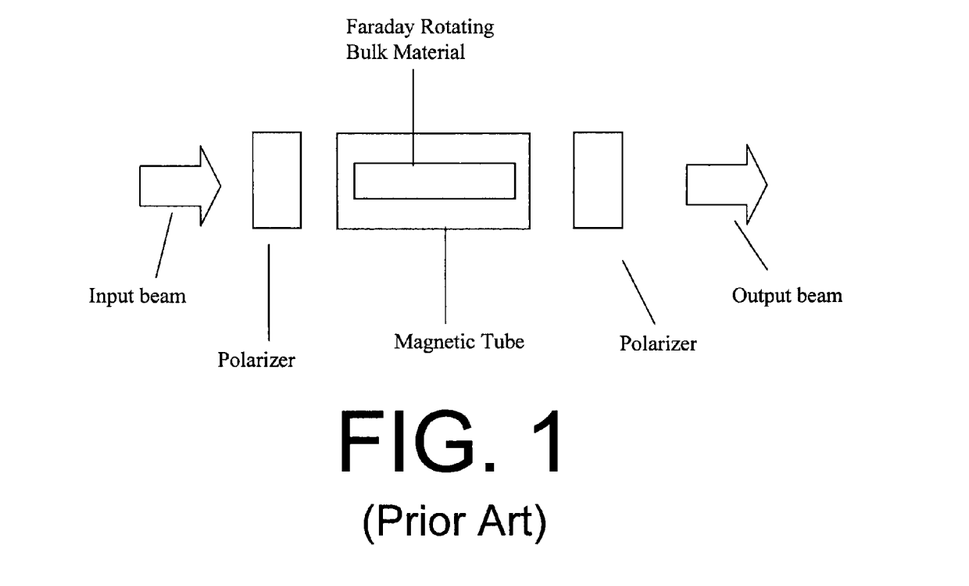
FIG. 1 is a schematic of an exemplary prior art free-space Faraday isolator.
Figure 2:
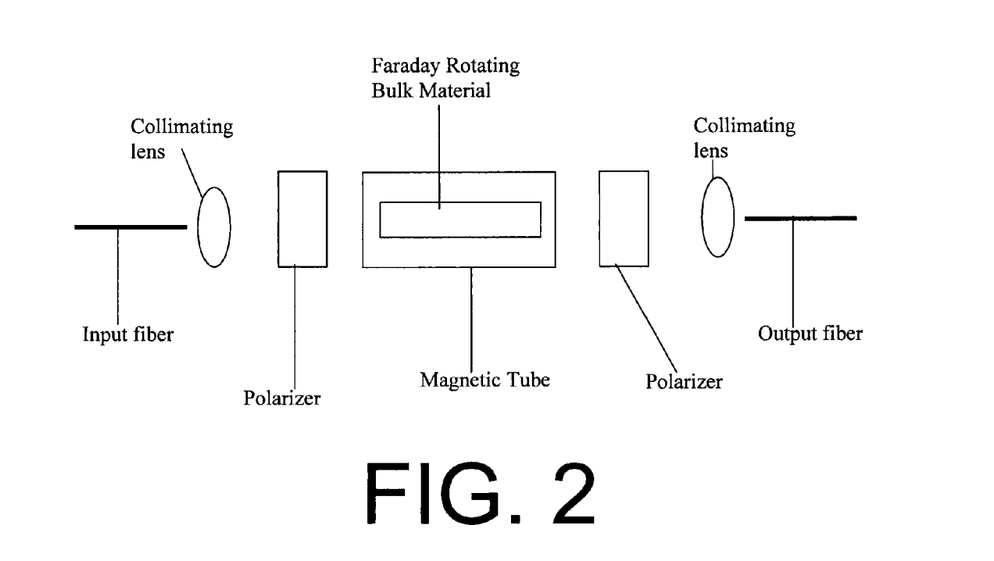
FIG. 2 is a schematic of an exemplary prior art fiber pig-tailed free-space Faraday isolator.
Figure 13:
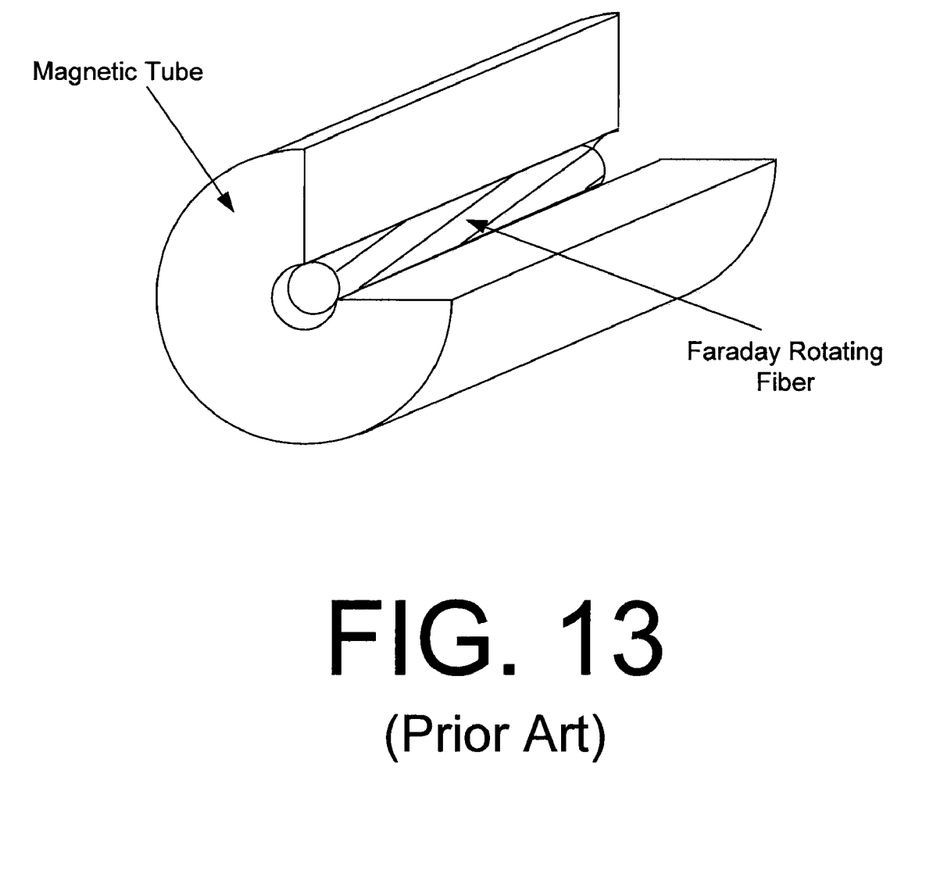
FIG. 13 is a cross section, perspective view of an exemplary prior art Faraday rotator.

Common commercially available Faraday isolators are free-space isolators. As will be appreciated by one of ordinary skill in the art, free-space isolators have actual space between components. FIG. 1 presents a schematic of an exemplary prior art free-space Faraday isolator and FIG. 2 presents a schematic of an exemplary prior art fiber pigtailed free-space Faraday isolator. FIG. 13 presents a cross-section perspective view of an exemplary prior art Faraday rotator that may be used as the Faraday rotator of FIGS. 1 and/or 2.

The development of fiber isolators has become critical given recent advancements in high powered fiber lasers. Fiber lasers having as great as ten (10) kilowatts of output power have been demonstrated, enabling a wide range of new applications including laser welding, laser cutting, laser drilling, and military defense applications. Even though these fiber lasers have been successfully introduced into industry, much of their potential is retarded due to the limitations of the currently-available fiber isolators. For the moment, free-space fiber pigtailed isolators, such as depicted in FIG. 2, must be used. Such free-space isolators require fiber termination, lens alignment, and recoupling of the laser to fiber, all of which degrades performance of the fiber lasers. Not only does the use of a free-space isolator limit the power of a fiber laser to about 20 W, but it also lowers the ruggedness and reliability, two of the main advantages of a fiber laser over a free-space solid-state laser.

Applicant's invention comprises a rare-earth doped fiber having a doping concentration greater than 55% (wt.). In certain embodiments, the doping concentration is greater than 65% (wt.). In certain embodiments, the doping concentration is greater than 70% (wt.). In certain embodiments, the doping concentration is between 55%-85% (wt./wt.).

In certain embodiments, Applicant's fiber is a single mode fiber, wherein a single mode fiber is an optical fiber designed to carry only a single ray of light. In certain embodiments, Applicant's fiber is a multiple mode fiber, wherein a multiple mode fiber is an optical fiber designed to carry multiple rays of light.

Applicant's invention further comprises a rare-earth doped fiber, used as a Faraday rotating element, that is fusion spliced with a fiber-based polarizer to form an all-fiber isolator. One of ordinary skill in the art will appreciate that fusion splicing joins two optical fibers end-to-end using heat in such a manner that light passing through the fibers is not scattered or reflected by the splice.

In certain embodiments, the throughput power of Applicant's Faraday rotating element is greater than 100 watts.

Figure 3:
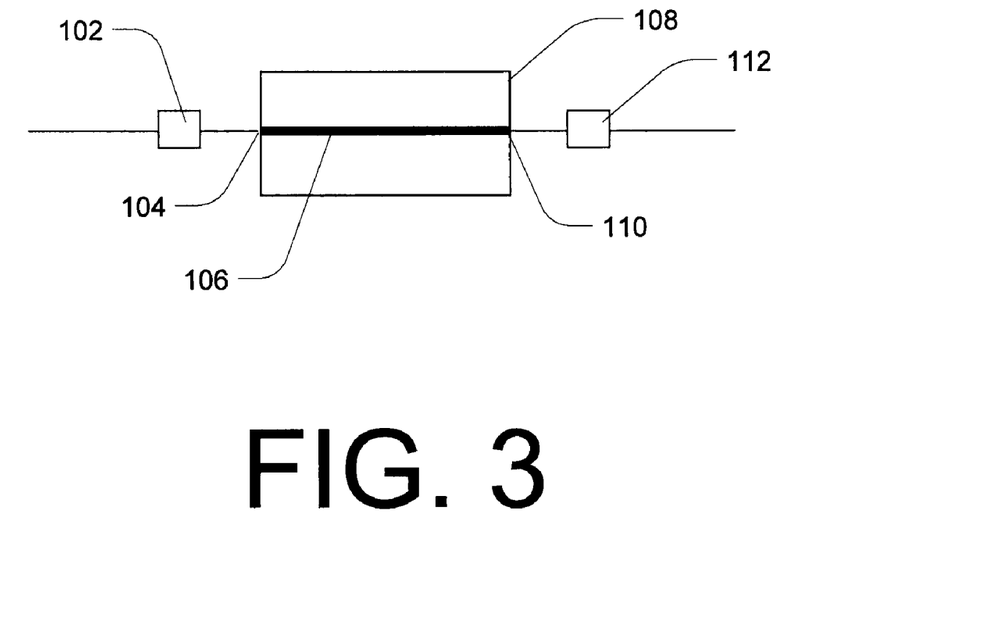
FIG. 3 is an exemplary schematic of Applicant's all-fiber isolator.

Turning now to FIG. 3, illustrates one embodiment of Applicant's all-fiber isolator. In the illustrated embodiment of FIG. 3, Applicant's all-fiber isolator comprises a first fiber-based polarizer 102, Faraday rotating fiber 106 disposed within magnetic tube 108, and a second fiber-based polarizer 112, wherein both ends of Faraday rotating fiber 106 are fusion spliced (depicted by fiber fusion splicing joints 104 and 110) and act as the Faraday rotating element.

Faraday rotating fiber 106 can be doped with any rare-earth oxide. In certain embodiments, Faraday rotating fiber 106 is doped with $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, $Lu_2O_3$, or a combination thereof.

Figure 5:
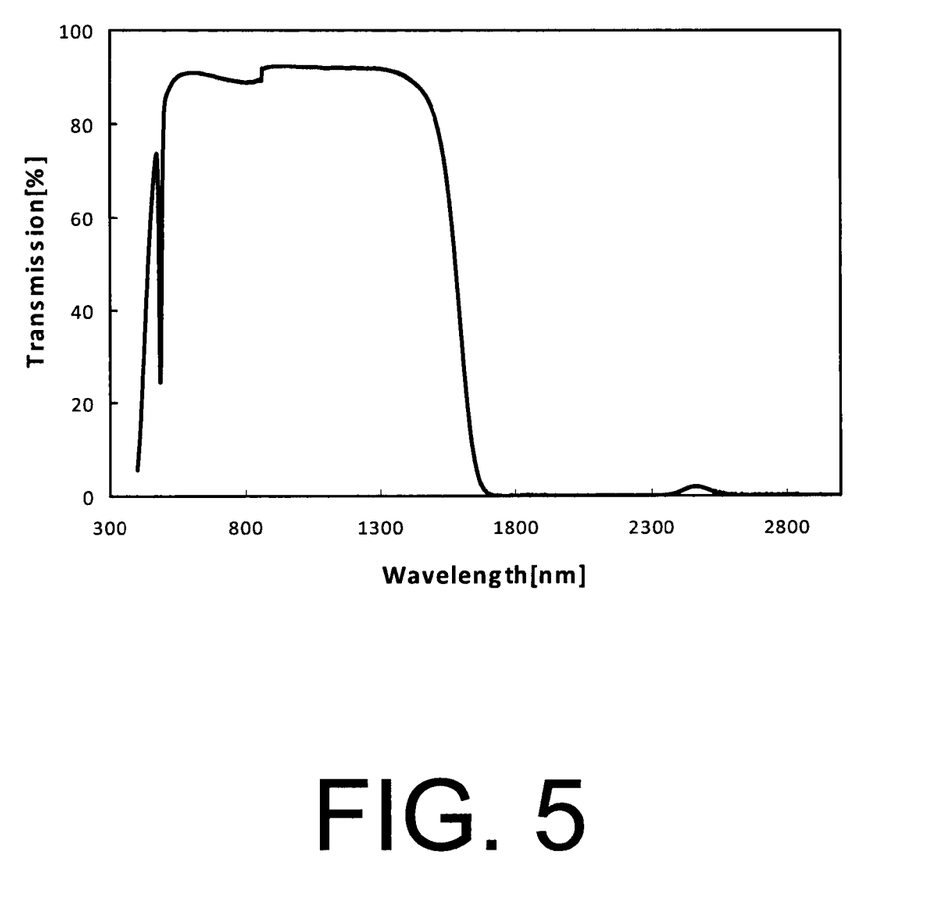
FIG. 5 is a graph of the transmission spectra of terbium-doped glass.

In certain embodiments, Faraday rotating fiber 106 is doped with $Tb_2O_3$. The transmission spectra of terbium-doped glass is presented in FIG. 5. As can be seen in the illustrated embodiment of FIG. 5, while $Tb_2O_3$ exhibits the largest Verdet constant out of the rare-earth oxides, it also absorbs light near 1.5 microns and 2 microns. This is significant as near 1.5 micron and near 2 micron fiber lasers have a high transmission in air and are considered to emit an eye-safe wavelength.

Figure 6:
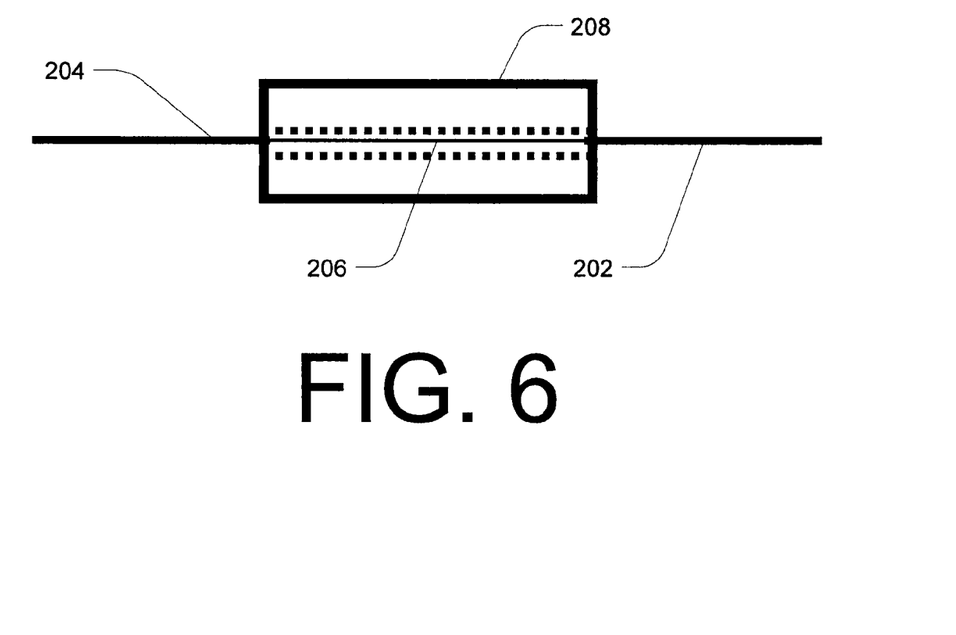
FIG. 6 is a schematic of another embodiment of Applicant's all-fiber isolator comprising two types of fibers having opposite Verdet Constants.
Figure 7:
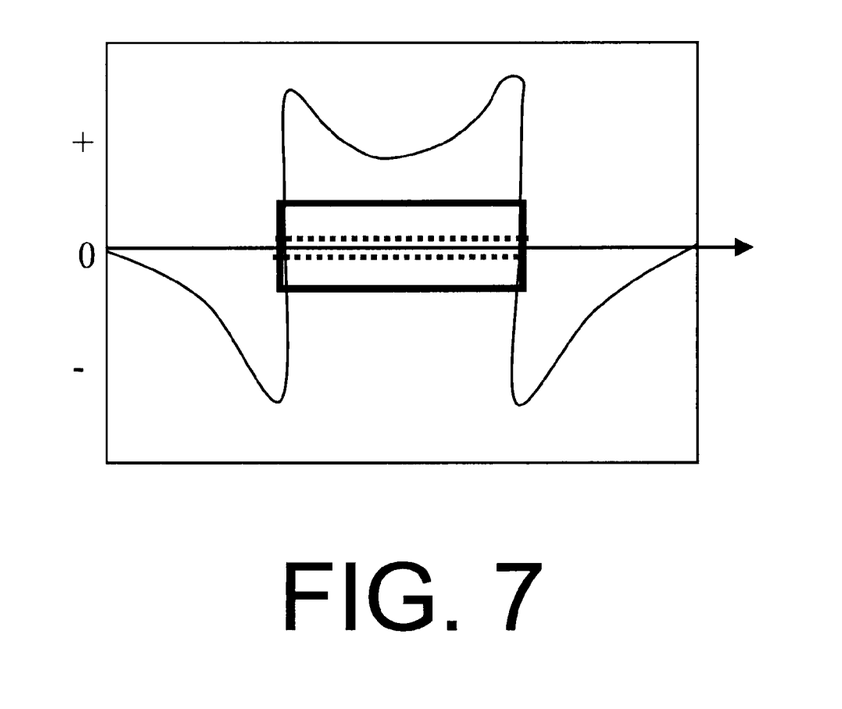
FIG. 7 is a graph of the magnetic filed distribution of the all-fiber isolator of FIG. 6.

FIG. 6 illustrates an alternative embodiment of Applicant's all-fiber isolator. FIG. 7 depicts the magnetic field distribution of the all-fiber isolator of FIG. 6.

In the illustrated embodiment of FIG. 6, the Faraday rotation of Applicant's all-fiber isolator is increased by using two different fibers having Verdet constants with opposite signs, wherein one fiber is placed inside of a magnetic tube and the other fiber is placed at one or both ends outside the magnetic tube. Thus, in the illustrated embodiment of FIG. 6, fibers 202 and 204 have a Verdet constant having a first sign while fiber 206, disposed within magnetic tube 208, has a Verdet constant having a different sign. In certain embodiments, fibers 202 and 204 are fusion spliced with fiber 206. In certain embodiments, fiber 206 within magnetic tube 208 has a negative Verdet constant while fibers 202 and 204 have a positive Verdet constant. In other embodiments, fiber 206 has a positive Verdet constant, and fibers 202 and 204 have a negative Verdet constant. In certain embodiments, the fiber having a positive Verdet constant is doped with $Yb_2O_3$, $Sm_2O_3$, Gd$_2$O$_3$, and/or Tm$_2$O$_3$. In certain embodiments, the fiber having a negative Verdet constant is doped with Tb$_2$O$_3$.

Returning to FIG. 3, in certain embodiments, Faraday rotating fiber 106 is doped with La$_2$O$_3$, Ga$_2$O$_3$, Yb$_2$O$_3$, Ce$_2$O$_3$. In such embodiments, the fiber laser may be a near 1.5 micron or a near 2 micron fiber laser.

In certain embodiments, Faraday rotating fiber 106 comprises a multicomponent glass. In such embodiments, the core and cladding of Faraday rotating fiber 106 may comprise silicate glass, germanate glass, phosphate glass, borate glass, tellurite glass, bismuth glass, or aluminate glass.

In certain embodiments, the multicomponent glass comprising Faraday rotating fiber 106 further comprises glass network formers, intermediates, and modifiers. In certain embodiments, the network structure of glass includes different types of atoms which can significantly change the properties of the glass. Cations can act as network modifiers, disrupting the continuity of the network, or as formers, which contribute to the formation of the network. Network formers have a valence greater than or equal to three and a coordination number not larger than four. Network intermediates have a lower valence and higher coordination number than network formers. In certain embodiments, one or more glass network formers of the multicomponent glass of Faraday rotating fiber 106 comprise SiO$_2$, GeO$_2$, P$_2$O$_5$, B$_2$O$_3$, TeO$_2$, Bi$_2$O$_3$, or Al$_2$O$_3$.

Table 1 presents examples of terbium-doped silicate glasses, erbium doped glasses, and ytterbium-doped silicate glasses. One of ordinary skill in the art will appreciate that Table 1 is meant to be illustrative and not limiting.

TABLE 1

[Shibin: the first example glass does not equal 100% - is this correct?]

| Composition | SiO$_2$ | Al$_2$O$_3$ | B$_2$O$_3$ | CeO$_2$ | Tb$_2$O$_3$ |
|---|---|---|---|---|---|
| wt % | 9.9 | 0.9 | 7.4 | 0.1 | 72.7 |
| wt % | 13.3 | 13.9 | 10.7 | 0 | 62.2 |
| wt % | 12.2 | 13.3 | 10 | 0 | 64.5 |
| Composition | SiO$_2$ | Al$_2$O$_3$ | B$_2$O$_3$ | CeO$_2$ | Yb$_2$O$_3$ |
| wt % | 14.8 | 16.5 | 10.3 | 0.1 | 58.3 |
| Composition | SiO$_2$ | Al$_2$O$_3$ | B$_2$O$_3$ | CeO$_2$ | Er$_2$O$_3$ |
| wt % | 15.1 | 16.8 | 10.5 | 0.1 | 57.6 |
| Composition | SiO$_2$ | Al$_2$O$_3$ | B$_2$O$_3$ | CeO$_2$ | Yb$_2$O$_3$ |
| wt % | 16 | 17.8 | 11.1 | 0.1 | 55 |

Figure 4:
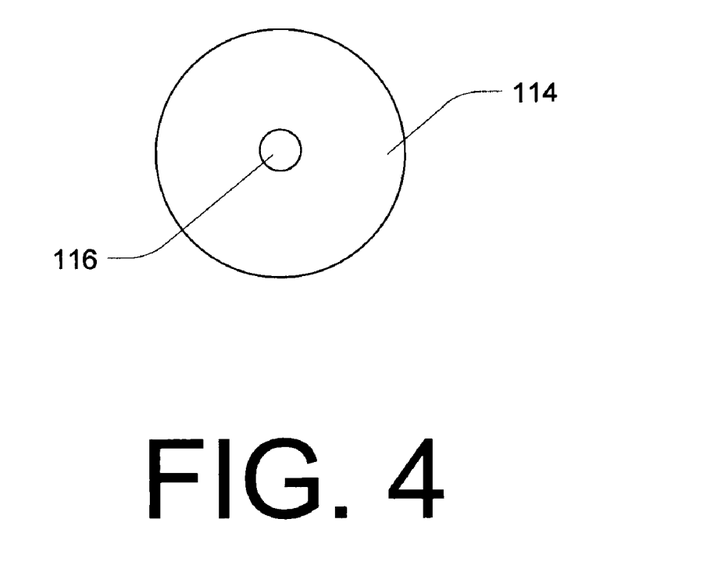
FIG. 4 is a cross sectional view of an exemplary highly rare-earth doped fiber for use as a Faraday rotating fiber according to Applicants' invention.

Turning now to FIG. 4, a cross sectional view of an exemplary highly rare-earth doped fiber for use as a Faraday rotating fiber according to Applicant's invention. In the illustrated embodiment of FIG. 4, core glass rod 116 is surrounded by cladding glass tube 114. In such embodiments, the diameter of core glass rod 116 is the same as the inside diameter of cladding glass tube 114, such that there is no void between the core and the cladding.

In certain embodiments, Applicant's Faraday rotating fiber, as depicted in the illustrated embodiment of FIG. 4, is manufactured using a rod-in-tube fiber drawing technique. In the rod-in-tube method, a glass rod having a higher refractive index is placed in a glass tube of lower refractive index of compatible material and is then heated until the tube shrinks around the rod. In such embodiments, core glass rod 116 is drilled from a bulk highly rare-earth doped glass and the outside of the core glass rod 116 is polished to a high surface quality. In such embodiments, cladding glass tube 114 is fabricated from another piece of rare-earth doped glass with a slightly lower refractive index. In such embodiments, the inner and outer surfaces of cladding glass tube 114 are polished to a high surface quality.

Figure 8:
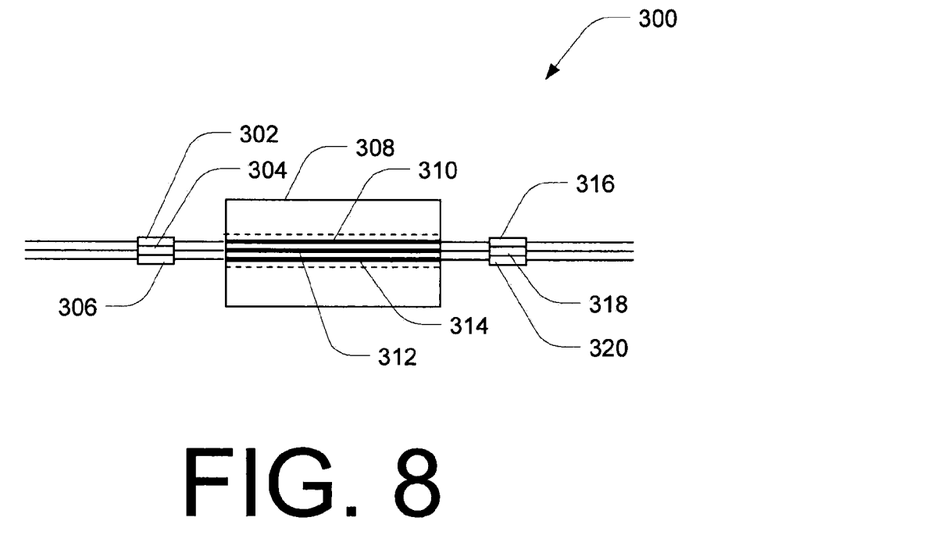
FIG. 8 is a schematic of Applicant's Faraday isolator array.

In certain embodiments, Applicant's all-fiber isolator, such as that illustrated in FIG. 3, can be configured as an Faraday isolator array. FIG. 8 illustrates Applicant's Faraday isolator array 300. In the illustrated embodiment of FIG. 8, Applicant's isolator array 300 comprises fiber-based polarizers 302, 304, 306, 316, 318, and 320, and Faraday rotating fibers 310, 312, and 314 inside magnetic tube 308, wherein either ends of Faraday rotating fibers 310, 312, and 314 are fusion spliced and act as the Faraday rotating element.

In certain embodiments, the inner diameter of magnetic tube 308 is about 1 mm to about 10 mm. In certain embodiments the diameter of each faraday rotating fiber 310, 312, and 314 is about 0.125 mm.

In certain embodiments, Faraday rotating fibers 310, 312, and 314 are all the same type of glass fibers doped with the same rare-earth oxides. In other embodiments, Faraday rotating fibers 310, 312, and 314 are each a different type of glass fibers doped with a different rare-earth oxides. In such embodiments, the different fibers may be used for different laser wavelengths. In such embodiments, the different fibers may function differently, such as, and without limitation, a first rotating fiber may absorb a specific band of light while a second rotating fiber absorbs a different band of light. In other embodiments, Faraday rotating fibers 310, 312, and 314 are the same type of glass fibers but are each doped with a different type or concentration of a rare-earth oxide.

In certain embodiments, fiber-based polarizers 302, 204, 306, 316, 318, and 320 are all the same type of fiber-based polarizers. In certain embodiments, fiber-based polarizers 302, 204, 306, 316, 318, and 320 differ.

Figure 9:
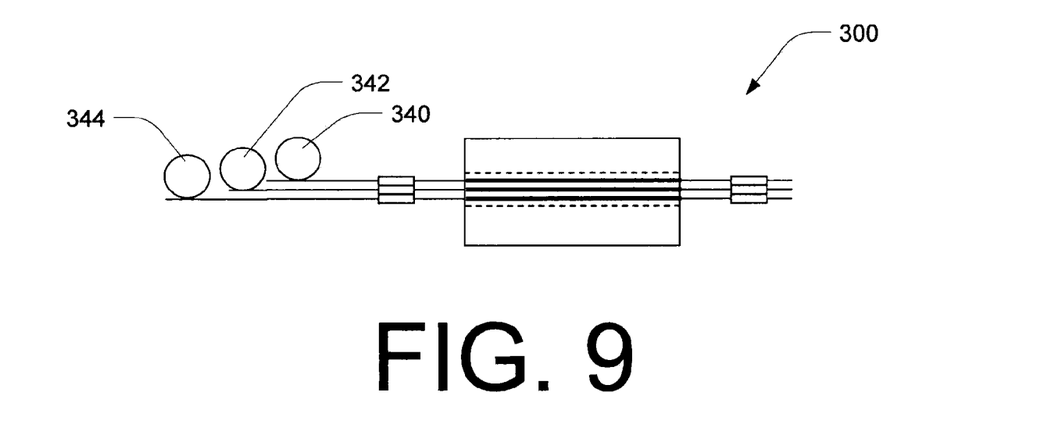
FIG. 9 is a schematic of a system comprising Applicant's Faraday isolator array and an array of fiber lasers.

FIG. 9 presents a schematic of an exemplary system comprising the Faraday isolator array 300 of FIG. 8 and an array of fiber lasers. In the illustrated embodiment of FIG. 9, isolator array 300 is shown with fiber lasers 340, 342, and 344. As will be appreciated by one of ordinary skill in the art, a fiber laser is a laser in which the active gain medium is an optical fiber doped with rare-earth elements. In certain embodiments, fiber lasers 340, 342, and 344 are the same. In other embodiments, fiber lasers 340, 342, and 244 differ in terms of, by way of example and not limitation, power output, wavelength, and/or pulse duration.

Figure 10:
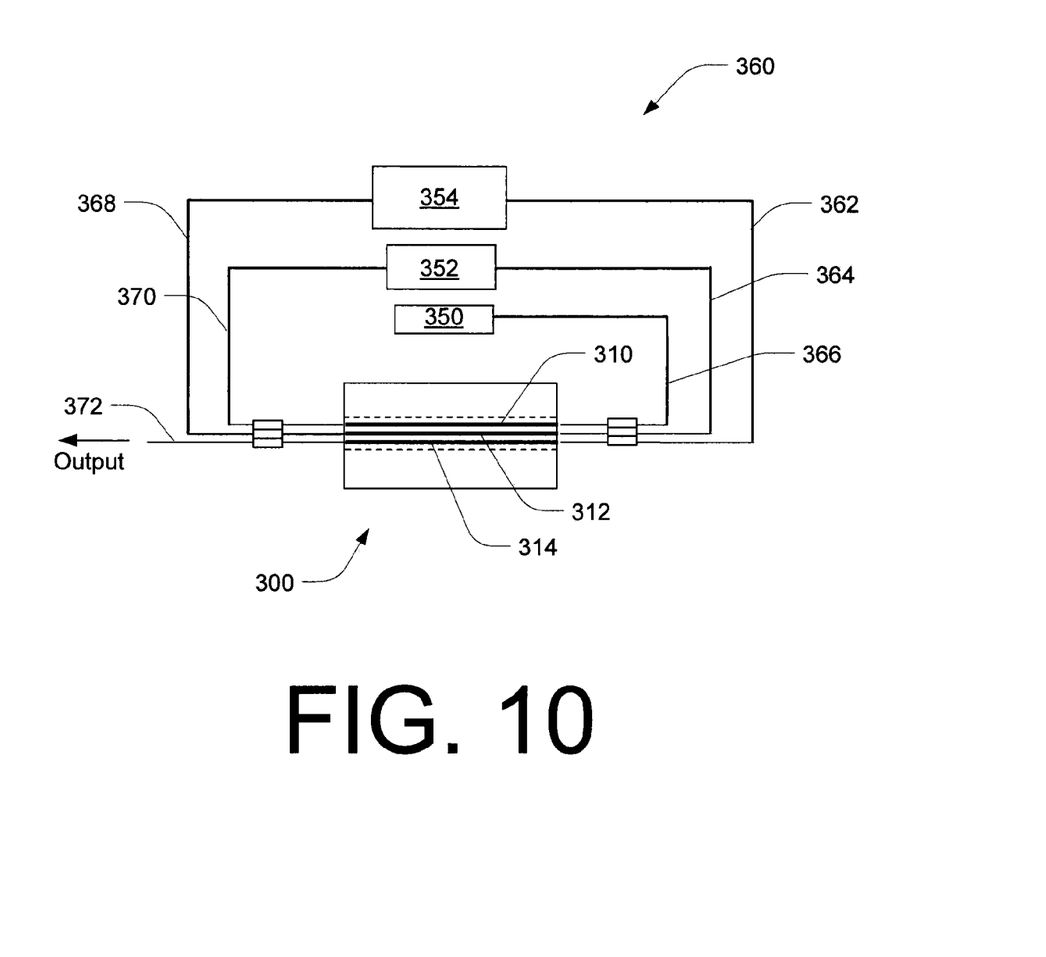
FIG. 10 is a schematic of a system comprising Applicant's Faraday isolator array and a series of cascade fiber lasers and amplifiers.

FIG. 10 presents a schematic of an exemplary system comprising the Faraday isolator array 300 of FIG. 8 and a series of cascade fiber lasers and amplifiers. In the illustrated embodiment of FIG. 10, system 360 comprises isolator array 300, cascade fiber laser 350, and amplifiers 352 and 354. A first end of fiber 310 is connected to laser 350 and a second end to amplifier 352. Amplifier 352 is additionally connected to a first end of fiber 312. The second end of fiber 312 is connected to amplifier 354 which is further connected to fiber 314.

In certain embodiments, fibers 362, 364, and 366 and fibers 368, 370, and 372 are the same as fibers 310, 312, and 314, respectively. In other embodiments, fibers 362, 364, and 366 and fibers 368, 370, and 372 differ from fibers 310, 312, and 314, respectively, in terms of, by way of example and not limitation, glass type, doping element, and/or doping concentration. In certain embodiments, fibers 362, 364, and 366 and fibers 368, 370, and 372 have different Verdet constants from fibers 310, 312, and 314, respectively. In such embodiments, the Verdet constant of fibers 62, 364, and 366 and fibers 368, 370, and 372 may have the opposite sign of the Verdet constant of fibers 310, 312, and 314, respectively In certain embodiments, fibers 362, 364, and 366 are the same as fibers 368, 370, and 372, respectively. In other embodiments, fibers 362, 364, and 366 differ from fibers 368, 370, and 372, respectively, in terms of, by way of example and not limitation, glass type, doping element, and/or doping concentration.

Figure 11:
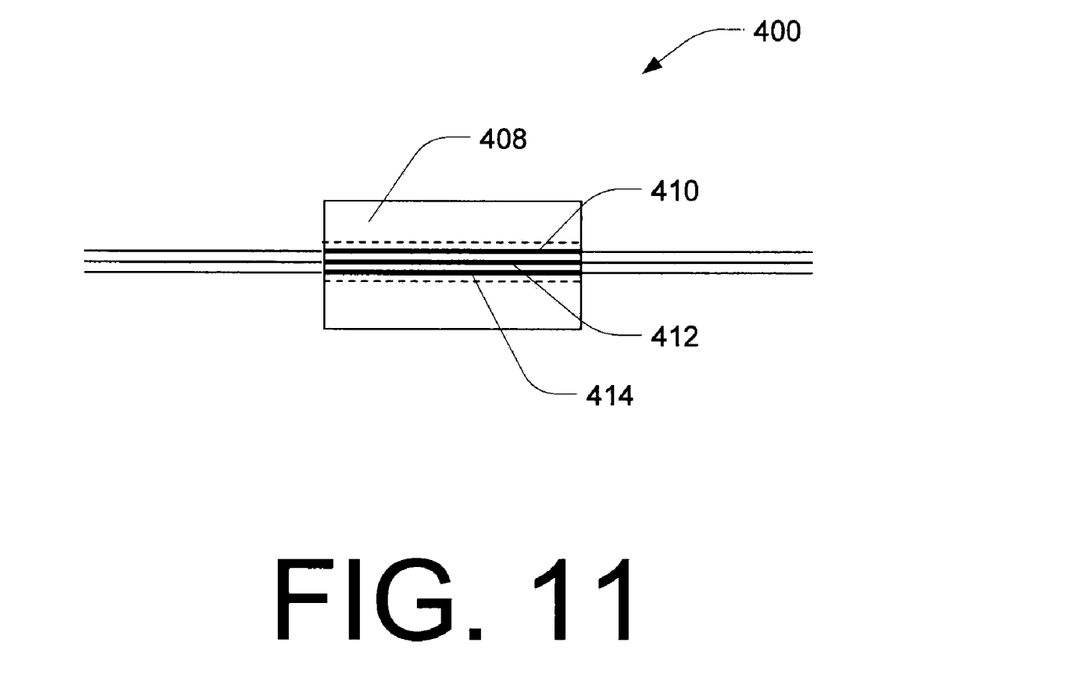
FIG. 11 is a schematic of Applicant's Faraday rotator array.

In certain embodiments, Applicant's rare-earth doped fiber can be used in an Faraday rotator array. An exemplary schematic of Applicant's Faraday rotator array 400 is depicted in FIG. 11. As can be seen in the illustrated embodiment of FIG. 11, Applicant's rotator array 400 comprises Faraday rotating fibers 410, 412, and 414 inside magnetic tube 408, wherein either ends of Faraday rotating fibers 410, 412, and 414 are fusion spliced and act as the Faraday rotating element.

Figure 12:
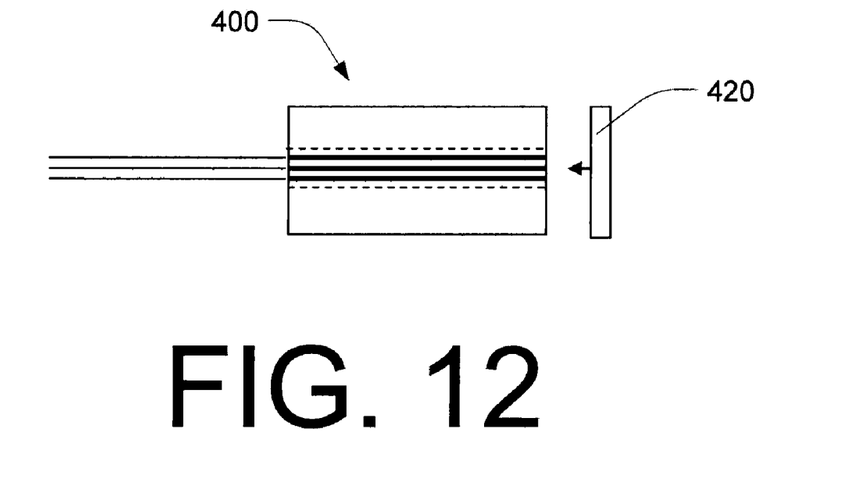
FIG. 12 is a schematic of Applicant's Faraday rotator array with a reflective element.

FIG. 12 depicts an exemplary schematic of Applicant's faraday rotator array 400 with a reflective element 420. In certain embodiments, reflective element 420 is a fiber Bragg grating, metallic coating, dielectric coating, or a combination thereof.

In certain embodiments, Faraday rotating fibers 410, 412, and 414 are all the same type of glass fibers doped with the same rare-earth oxides. In other embodiments, Faraday rotating fibers 410, 412, and 414 are each a different type of glass fibers doped with a different rare-earth oxides. In such embodiments, the different fibers may be used for different laser wavelengths. In such embodiments, the different fibers may function differently, such as, and without limitation, a first rotating fiber may absorb a specific band of light while a second rotating fiber absorbs a different band of light. In other embodiments, Faraday rotating fibers 410, 412, and 414 are the same type of glass fibers but are each doped with a different type or concentration of a rare-earth oxide.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

While the preferred embodiments of the present invention have been illustrated in detail, it should be apparent that modifications and adaptations to those embodiments may occur to one skilled in the art without departing from the scope of the present invention as set forth in the following claims.

I claim:

1. An all-fiber Faraday rotator array, comprising:
   a plurality of Faraday rotating fibers each comprising a core having a first doping concentration of 55%-85% (wt./wt.) of a first rare-earth oxide; and
   a cladding having a second doping concentration of 55%-85% (wt./wt.) of a second rare-earth oxide;
   wherein:
   the first rare-earth oxide and the second rare-earth oxide are selected from the group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$;
   a refractive index of the cladding is lower than a refractive index of the core; and
   a magnetic tube surrounding the plurality of Faraday rotating fibers.

2. The all-fiber Faraday rotator array of claim 1, wherein each of the plurality of Faraday rotating fibers further comprise:
   one or more network formers selected from the group consisting of $SiO_2$, $GeO_2$, $P_2O_5$, $B_2O_3$, $TeO_2$, $Bi_2O_3$, and $Al_2O_3$;
   a network intermediate; and
   a network modifier.

3. The all-fiber Faraday rotator array of claim 1, wherein the doping concentration is between 65% (wt.) to 85% (wt.).

4. The all-fiber Faraday rotator array of claim 1, wherein the doping concentration is between 70% (wt.) to 85% (wt.).

5. The all-fiber Faraday rotator array of claim 1, wherein the rare-earth oxide is selected from the group consisting of $La_2O_3$, $Ga_2O_3$, $Yb_2O_3$, and $Ce_2O_3$, the all-fiber Faraday rotator array further comprising a fiber laser wavelength between 1.5 microns to 2.5 microns.

6. The all-fiber Faraday rotator array of claim 1, wherein at least one of the plurality of Faraday rotating fibers is a single mode fiber.

7. The all-fiber Faraday rotator array of claim 1, wherein at least one of the plurality of Faraday rotating fibers is a multiple mode fiber.

8. The all-fiber Faraday rotator array of claim 1, further comprising a reflective element selected from the group comprising:
   a fiber Bragg grating;
   a metallic coating;
   a dielectric coating; and
   a combination thereof.

9. The all-fiber Faraday rotator array of claim 1, wherein a first one of the plurality of Faraday rotating fibers is doped with a first rare-earth oxide and a second one of the plurality of Faraday rotating fibers is doped with a second rare-earth oxide, wherein the first rare-earth oxide and the second rare-earth oxide differ.

10. The all-fiber Faraday rotator array of claim 1, wherein a first one of the plurality of Faraday rotating fibers absorbs a first range of wavelengths and a second one of the plurality of Faraday rotating fibers absorbs a second range of wavelengths, wherein the first range of wavelengths and the second range of wavelengths differ.

11. An all-fiber Faraday rotator array, comprising:
   a plurality of Faraday rotating fibers each comprising a core having a first doping concentration of 55%-85% (wt./wt.) of a first rare-earth oxide; and
   a cladding having a second doping concentration of 55%-85% (wt./wt.) of a second rare-earth oxide;
   wherein:
   the first rare-earth oxide and the second rare-earth oxide are selected from the group consisting of $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $La_2O_3$, $Ga_2O_3$, $Ce_2O_3$, and $Lu_2O_3$;
   a refractive index of the cladding is lower than a refractive index of the core;
   a magnetic tube surrounding the plurality of Faraday rotating fibers; and
   a plurality of fiber-based polarizers;
   wherein:
   each of the plurality of Faraday rotating fibers further comprises a first end and a second end, wherein the first end and the second end are fusion spliced, and
   for each of the plurality of Faraday rotating fibers, a first one of the plurality of fiber-based polarizers is attached to the first end and a second one of the plurality of fiber-based polarizers is attached to the second end.

12. The all-fiber Faraday isolator array of claim 11, wherein each of the plurality of Faraday rotating fibers further comprise:

one or more network formers selected from the group consisting of $SiO_2$, $GeO_2$, $P_2O_5$, $B_2O_3$, $TeO_2$, $Bi_2O_3$, and $Al_2O_3$;
a network intermediate; and
a network modifier.

13. The all-fiber Faraday isolator array of claim 11, wherein the doping concentration is between 65% (wt.) to 85% (wt.).

14. The all-fiber Faraday isolator array of claim 11, wherein the doping concentration is between 70% (wt.) to 85% (wt.).

15. The all-fiber Faraday isolator array of claim 11, wherein the rare-earth oxide is selected from the group consisting of $La_2O_3$, $Ga_2O_3$, $Yb_2O_3$, and $Ce_2O_3$, the all-fiber Faraday rotator array further comprising a fiber laser wavelength between 1.5 microns to 2.5 microns.

16. The all-fiber Faraday isolator array of claim 11, wherein at least one of the plurality of Faraday rotating fibers is a single mode fiber.

17. The all-fiber Faraday isolator array of claim 11, wherein at least one of the plurality of Faraday rotating fibers is a multiple mode fiber.

18. The all-fiber Faraday isolator array of claim 11, wherein a first one of the plurality of Faraday rotating fibers is doped with a first rare-earth oxide and a second one of the plurality of Faraday rotating fibers is doped with a second rare-earth oxide, wherein the first rare-earth oxide and the second rare-earth oxide differ.

19. The all-fiber Faraday isolator array of claim 11, wherein a first one of the plurality of Faraday rotating fibers absorbs a first range of wavelengths and a second one of the plurality of Faraday rotating fibers absorbs a second range of wavelengths, wherein the first range of wavelengths and the second range of wavelengths differ.

20. The all-fiber Faraday isolator array of claim 11, further comprising a plurality of fiber lasers, wherein each of the plurality of fiber lasers are attached to one of the plurality of Faraday rotating fibers.

21. The all-fiber Faraday isolator array of claim 11, further comprising
a fiber laser attached to a first one of the plurality of Faraday rotating fibers; and
a plurality of amplifiers;
wherein the plurality of amplifiers comprise (N) amplifiers, wherein the plurality of Faraday rotating fibers comprise (P) Faraday rotating fibers, wherein (N) and (P) are greater than 1, wherein (N) equals (P) minus 1, wherein (i) is initially set to 1, and wherein (i) is less than or equal to (N), a first end of the (i)th amplifier is attached the (i)th Faraday rotating fiber and a second end of the (i)th amplifier is attached to the (i)th+1 Faraday rotating fiber, wherein (i) is initially set to 1, and wherein (i) is less than or equal to (N).

* * * * *

UNITED STATES PATENT AND TRADEMARK OFFICE
CERTIFICATE OF CORRECTION

| | | |
|---|---|---|
| PATENT NO. | : 8,374,468 B2 | Page 1 of 1 |
| APPLICATION NO. | : 12/778712 | |
| DATED | : February 12, 2013 | |
| INVENTOR(S) | : Shibin Jiang | |

It is certified that error appears in the above-identified patent and that said Letters Patent is hereby corrected as shown below:

In the Specification

Col. 1, lines 18-22

Please replace the paragraph after the GOVERNMENT RIGHTS heading with the following:

-- This invention was made with Government support under Contract FA9451-10-D-0233, FA9451-10-M-0076, and FA8650-09-C-5433 awarded by the United States Air Force. The Government has certain rights in the invention. --

Signed and Sealed this
Eighth Day of July, 2014

Michelle K. Lee
*Deputy Director of the United States Patent and Trademark Office*